(12) United States Patent
Tang et al.

(10) Patent No.: US 12,480,383 B2
(45) Date of Patent: Nov. 25, 2025

(54) GEOLOGICAL CARBON SEQUESTRATION AND HYDROGEN PRODUCTION STRUCTURE AND METHOD BASED ON THE SPONTANEOUS REACTION OF WATER-CO₂-ACTIVE MINERALS

(71) Applicant: WUHAN UNIVERSITY, Hubei (CN)

(72) Inventors: Xuhai Tang, Hubei (CN); Quansheng Liu, Hubei (CN); Yiwei Liu, Hubei (CN); Lizhi Huang, Hubei (CN); Yuwen Tong, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/906,158

(22) Filed: Oct. 3, 2024

(65) Prior Publication Data

US 2025/0283392 A1    Sep. 11, 2025

(30) Foreign Application Priority Data

Mar. 5, 2024   (CN) .......................... 202410245682.6

(51) Int. Cl.
*E21F 17/16*   (2006.01)
*E21B 41/00*   (2006.01)

(52) U.S. Cl.
CPC .............................. *E21B 41/0064* (2013.01)

(58) Field of Classification Search
CPC ......... E21B 41/0064; C01B 3/06; C01B 3/04; C01G 49/08; C01F 5/24; C22B 1/00; C22B 23/00; F26B 7/00
USPC ....................................................... 166/305.1
See application file for complete search history.

(56) References Cited

U.S. PATENT DOCUMENTS

| | | | |
|---|---|---|---|
| 8,934,546 B2 * | 1/2015 | Haskell ................... | H04N 19/51 375/240.26 |
| 11,359,862 B1 * | 6/2022 | Nyer ........................ | F26B 25/16 |
| 2010/0077752 A1 * | 4/2010 | Papile ................... | F01K 25/103 505/891 |

(Continued)

*Primary Examiner* — Nicole Coy
*Assistant Examiner* — Douglas S Wood
(74) *Attorney, Agent, or Firm* — JCIP GLOBAL INC.

(57) ABSTRACT

The present application is related to a geological carbon sequestration and hydrogen production structure and method based on the spontaneous reaction of water, $CO_2$, and active minerals, belonging to the field of carbon sequestration and hydrogen production technology. The method comprises the following steps: (1) $CO_2$ collection; (2) selecting a site for carbon sequestration and hydrogen production; (3) constructing a space for carbon sequestration and hydrogen production; (4) $CO_2$ mineralization sequestration and simultaneous hydrogen production; (5) hydrogen collection. The method permanently mineralizes and sequesters $CO_2$ while using the water-$CO_2$-active minerals reaction for simultaneous geological hydrogen production. It not only reduces the economic cost of $CO_2$ geological sequestration but also opens a new pathway for in-situ geological hydrogen production, achieving green and low-carbon hydrogen energy production. The geological carbon sequestration and hydrogen production structure is designed to have low sequestration costs and enable large-scale simultaneous geological hydrogen production.

7 Claims, 4 Drawing Sheets

(56) References Cited

U.S. PATENT DOCUMENTS

| | | | |
|---|---|---|---|
| 2011/0035154 A1* | 2/2011 | Kendall | C04B 28/10 422/111 |
| 2011/0174507 A1* | 7/2011 | Burnham | E21B 41/0064 166/402 |
| 2011/0220351 A1* | 9/2011 | Surguchev | E21B 43/24 166/260 |
| 2012/0118586 A1* | 5/2012 | Kameyama | E21B 41/0064 166/90.1 |
| 2016/0362800 A1* | 12/2016 | Ren | C25B 11/073 |
| 2023/0038447 A1* | 2/2023 | Hasan | E21B 43/164 |
| 2023/0102312 A1* | 3/2023 | Darrah | C01B 3/06 423/658 |
| 2024/0060397 A1* | 2/2024 | Tsuji | B01D 53/22 |
| 2024/0066434 A1* | 2/2024 | Al-Qasim | E21B 41/005 |

* cited by examiner

GEOLOGICAL CARBON SEQUESTRATION AND HYDROGEN PRODUCTION STRUCTURE AND METHOD BASED ON THE SPONTANEOUS REACTION OF WATER-$CO_2$-ACTIVE MINERALS

CROSS-REFERENCE TO RELATED APPLICATION

This application claims the priority benefit of China application no. 202410245682.6 filed on Mar. 5, 2024. The entirety of the above-mentioned patent application is hereby incorporated by reference herein and made a part of this specification.

BACKGROUND OF THE INVENTION

Technical Field

The invention pertains to the field of carbon sequestration and hydrogen production technology, specifically to a geological carbon sequestration and hydrogen production structure and method based on the spontaneous reaction of water, $CO_2$, and active minerals.

Background Art

With the rapid development of modern society, the demand for fossil energy is increasing, leading to a significant rise in greenhouse gas emissions such as carbon dioxide ($CO_2$) in the atmosphere. This has resulted in worsening global ecological issues such as rising temperatures and climate change. Reducing $CO_2$ emissions has become an urgent global need. Carbon Capture, Utilization, and Storage (CCUS) technology can separate $CO_2$ from industrial processes, energy use, or the atmosphere, and either utilize it or reinject it into geological formations for permanent reduction of $CO_2$. Additionally, CCUS is a crucial supplementary method for transitioning existing energy systems to low-carbon solutions, helping balance economic development with environmental protection.

Geological $CO_2$ sequestration holds the potential to permanently store up to trillions of tons of $CO_2$ in specific shallow or deep reservoirs. $CO_2$ mineralization sequestration technology involves dissolving $CO_2$ in formation water and reacting it with formation rock minerals to produce carbonate minerals, thus achieving mineralization sequestration. This method is the most permanent and safe mechanism of $CO_2$ geological sequestration. $CO_2$ mineralization sequestration features low raw material costs, low energy consumption, spontaneous reactions, and permanent carbon storage with no leakage risk, presenting promising application prospects.

Hydrogen energy offers high energy density, high calorific value, and diverse sources. Currently, hydrogen production is predominantly from fossil fuels, with "gray hydrogen" produced from coal, oil, and natural gas accounting for about 95%. Although this technology is mature, it releases large amounts of $CO_2$ during hydrogen production, making it less ideal from an environmental perspective. "Blue hydrogen," produced from natural gas via steam methane reforming or autothermal reforming, and "green hydrogen," produced using renewable energy, are still in development and are costly.

Traditional industrial hydrogen production methods require reaction vessels, energy input through processes like electrolysis, or catalysts, resulting in higher costs. While traditional deep geological $CO_2$ mineralization sequestration methods can store $CO_2$ in deep reservoirs and convert it into carbonate rocks, the methods have not yet integrated the advantages of mineralization sequestration sites for simultaneous geological hydrogen production.

SUMMARY OF THE INVENTION

In view of the deficiencies of existing technologies, the first aspect of the present invention provides a geological carbon sequestration and hydrogen production structure that offers lower sequestration costs and can simultaneously produce hydrogen compared to traditional industrial methods. This structure includes $CO_2$ injection channels, $H_2$ collection channels, geological reaction mineral layers, and sealing structures.

The geological reaction mineral layer includes active minerals that serve both as filling material and reaction substrates. The outer layer of the geological reaction mineral layer is enclosed by a sealing structure, which prevents the diffusion of $CO_2$ and hydrogen from the interior to the exterior.

The $CO_2$ injection channel penetrates the sealing structure and extends into the geological reaction mineral layer to inject the $CO_2$ and water needed for the reaction. Hydrogen gas generated from the reaction escapes from the geological reaction mineral layer due to the density difference with the active minerals and is collected via the $H_2$ collection channel that also penetrates the sealing structure.

Active minerals with carbon sequestration and hydrogen production capabilities include metal oxides that react with $CO_2$ to form carbonates and ferrous ions that react with water to generate hydrogen.

Preferably, the active minerals include at least one of the following: iron-rich minerals, nickel-rich minerals, pyroxene, olivine, magnetite, chalcopyrite, or basalt.

Utilizing active minerals with ferrous ions from basalt, chalcopyrite slag, and other sources, such as iron-rich minerals, nickel-rich minerals, pyroxene, olivine, magnetite, and chalcopyrite, can react spontaneously with water and $CO_2$ to produce hydrogen without additional energy input or catalysts.

Preferably, depending on the depth of the carbon sequestration and hydrogen production layer, the geological structure is divided into shallow and deep geological carbon sequestration and hydrogen production structures.

Further preferably, in the shallow geological carbon sequestration and hydrogen production structure, the sealing structure is an artificial sealing layer; the geological reaction mineral layer is an artificial storage layer, which may include abandoned open-pit mines or abandoned underground mining tunnels.

Further preferably, in the deep geological carbon sequestration and hydrogen production structure, the escaped hydrogen accumulates in a hydrogen-rich area formed by the sealing structure, and is recovered via the $H_2$ collection channel. The sealing structure is a natural cap rock, and the geological reaction mineral layer is a natural mineralization storage layer, including natural saline aquifers, depleted oil and gas reservoirs, or basalt formations rich in natural fractures.

In the second aspect of the present invention, a large-scale carbon sequestration and hydrogen production method that is easy to control is provided, using the geological carbon sequestration and hydrogen production structure described in the first aspect. This method is based on the spontaneous reaction of water, $CO_2$, and active minerals and includes the following steps:

(1) $CO_2$ Collection

Collecting $CO_2$ produced from industrial activities;

(2) Selecting Carbon Sequestration and Hydrogen Production Sites

Identifying suitable regions for geological carbon sequestration and hydrogen production through geological surveys, designating these areas as geological reaction mineral layers. Based on the depth of the carbon sequestration and hydrogen production layers, classify them into shallow and deep geological carbon sequestration and hydrogen production sites.

(3) Constructing the Carbon Sequestration and Hydrogen Production Space

Using a sealing structure to enclose the geological reaction mineral layer to store $CO_2$ and prevent hydrogen leakage. Connecting $CO_2$ injection channels and $H_2$ collection channels through the sealing structure to access the geological reaction mineral layer, creating a space for effective carbon sequestration, hydrogen production, and subsequent product recovery. Injecting $CO_2$ and water into the geological reaction mineral layer through the $CO_2$ injection channels;

(4) $CO_2$ Mineralization Sequestration and Simultaneous Gydrogen Production

Performing $CO_2$ mineralization sequestration and simultaneous hydrogen production using the spontaneous reaction between $CO_2$, water, and active minerals based on the $CO_2$-water-active mineral reaction.

(5) Hydrogen Collection

After $CO_2$ mineralization and hydrogen accumulation is complete, collecting hydrogen stored in the pore spaces of the geological reaction mineral layer and the upper space of the reservoir using the $H_2$ collection channel, along with other by-products.

Preferably, in step (2), shallow geological carbon sequestration and hydrogen production sites are artificial storage layers, such as abandoned open-pit mines or abandoned underground mining tunnels. Deep geological carbon sequestration and hydrogen production sites are natural mineralization storage layers, including natural saline aquifers, depleted oil and gas reservoirs, or basalt formations rich in natural fractures.

Further preferably, when shallow geological carbon sequestration and hydrogen production sites are used in step (2), the construction process of the carbon sequestration and hydrogen production space in step (3) includes designing and laying an artificial sealing layer, grinding active minerals to fill the artificial storage layer, and injecting $CO_2$ and water.

The design of the artificial sealing layer materials can be based on natural cap rock layers. For example, dense shale and diabase, found in natural hydrogen reservoirs in the Pyrenees in Spain and Bourakébougou in Mali, can be used as references. Grinding abundant natural active minerals such as basalt and chalcopyrite slag, and filling these into the shallow storage layer. These active minerals serve as both the filling material for open-pit mines and underground tunnels and the reaction substrates for carbon sequestration and hydrogen production. Minerals with carbon sequestration and hydrogen production capabilities include iron-rich minerals, nickel-rich minerals, pyroxene, olivine, magnetite, and chalcopyrite. Basalt, containing about 15% by mass of ferrous ions, is among these. This approach also addresses the issue of insufficient filling materials such as gangue. Finally, injecting a $CO_2$ and water mixture into the bottom of the geological storage site continuously using high-pressure injection equipment to react with the rock.

Further preferred embodiments of the invention are as follows:

1. Deep geological carbon sequestration and hydrogen production sites: When shallow geological carbon sequestration and hydrogen production sites are used in step (2), step (3) involves using natural mineralization storage layers and natural cap rock layers in deep reservoirs. $CO_2$ and water are injected using drilling or abandoned oil and gas wells.

2. Hydrogen collection in shallow sites: When shallow geological carbon sequestration and hydrogen production sites are used in step (2), step (5) involves collecting hydrogen and by-products using pipelines as $H_2$ collection channels.

3. Hydrogen collection in deep sites: When deep geological carbon sequestration and hydrogen production sites are used in step (2), step (5) involves identifying hydrogen accumulation areas and collecting hydrogen using wellbores as $H_2$ collection channels.

Based on the above technical solutions, the inventive concept of the present invention is to utilize the spontaneous reaction of water-$CO_2$-active minerals for both $CO_2$ mineralization sequestration and simultaneous hydrogen production. $CO_2$ dissolves in water to form carbonic acid. Active minerals containing ferrous ions, such as basalt, chalcopyrite, pyroxene, magnetite, and olivine, interact with carbonic acid, leading to the dissolution of ferrous-ion minerals such as iron-bearing minerals, nickel-bearing minerals, pyroxene, olivine, magnetite, and chalcopyrite, which release ferrous ions. These ferrous ions are adsorbed on the rock surface, serving as electron donors for water reduction and hydrogen production, without requiring additional energy input or catalysts. The reactions between rocks, $CO_2$, and water release magnesium, calcium, potassium, phosphorus, and other nutrients, with by-products that can be used as soil improvers to enhance crop yields.

The invention aims to use abandoned open-pit mines, abandoned underground mining tunnels, and natural geological spaces in deep reservoirs in combination with the water-$CO_2$-active mineral spontaneous reaction, which does not require additional energy input or catalysts, to significantly reduce hydrogen production costs. In shallow areas such as abandoned open-pit mines and underground mining tunnels, tailings and basalt can be used for carbon sequestration and hydrogen production, addressing the issue of insufficient backfill and filling materials. Shallow areas are accessible for construction activities such as rock filling, sealing layer installation, injection channel installation, collection channel installation, and calcium carbonate by-product recovery, making them easier to control and less demanding in terms of geological conditions. Deep natural geological spaces, such as natural saline aquifers and depleted oil and gas reservoirs, provide larger spaces for larger-scale carbon sequestration and hydrogen production.

Compared to existing technologies, the present invention offers the following advantages and beneficial effects:

1. The invention provides a structure designed with low geological requirements and ease of control, featuring low sequestration costs and the capability for large-scale simultaneous geological hydrogen production.

2. The method allows for permanent $CO_2$ mineralization sequestration while simultaneously producing hydrogen through spontaneous reactions of water-$CO_2$-active minerals.

This approach not only reduces the economic costs of $CO_2$ geological sequestration but also opens new pathways for in-situ geological hydrogen production, achieving green and low-carbon hydrogen production.

Reference signs: 1—$CO_2$ injection channel; 2—$H_2$ collection channel; 3—Artificial confining layer; 4—Artificial sealing layer; 5—Hydrogen-rich area; 6—Natural sealing cap layer; 7—Natural mineralization sequestration layer.

DETAILED DESCRIPTION OF THE EMBODIMENTS

The following embodiments further illustrate the present invention, but do not limit the scope of the invention to the described embodiments. Experimental methods without specific conditions in the following examples are selected according to conventional methods and conditions or according to the product instructions.

Example 1

Figure 1:
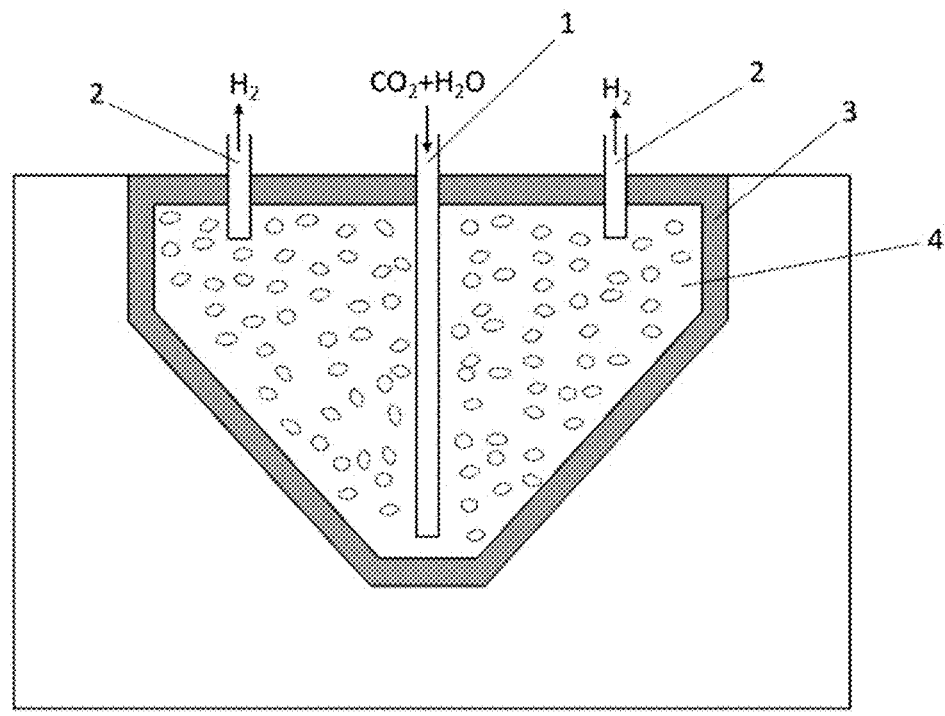
FIG. 1: Schematic diagram of carbon sequestration and hydrogen production in an abandoned open-pit mine.
Figure 4:
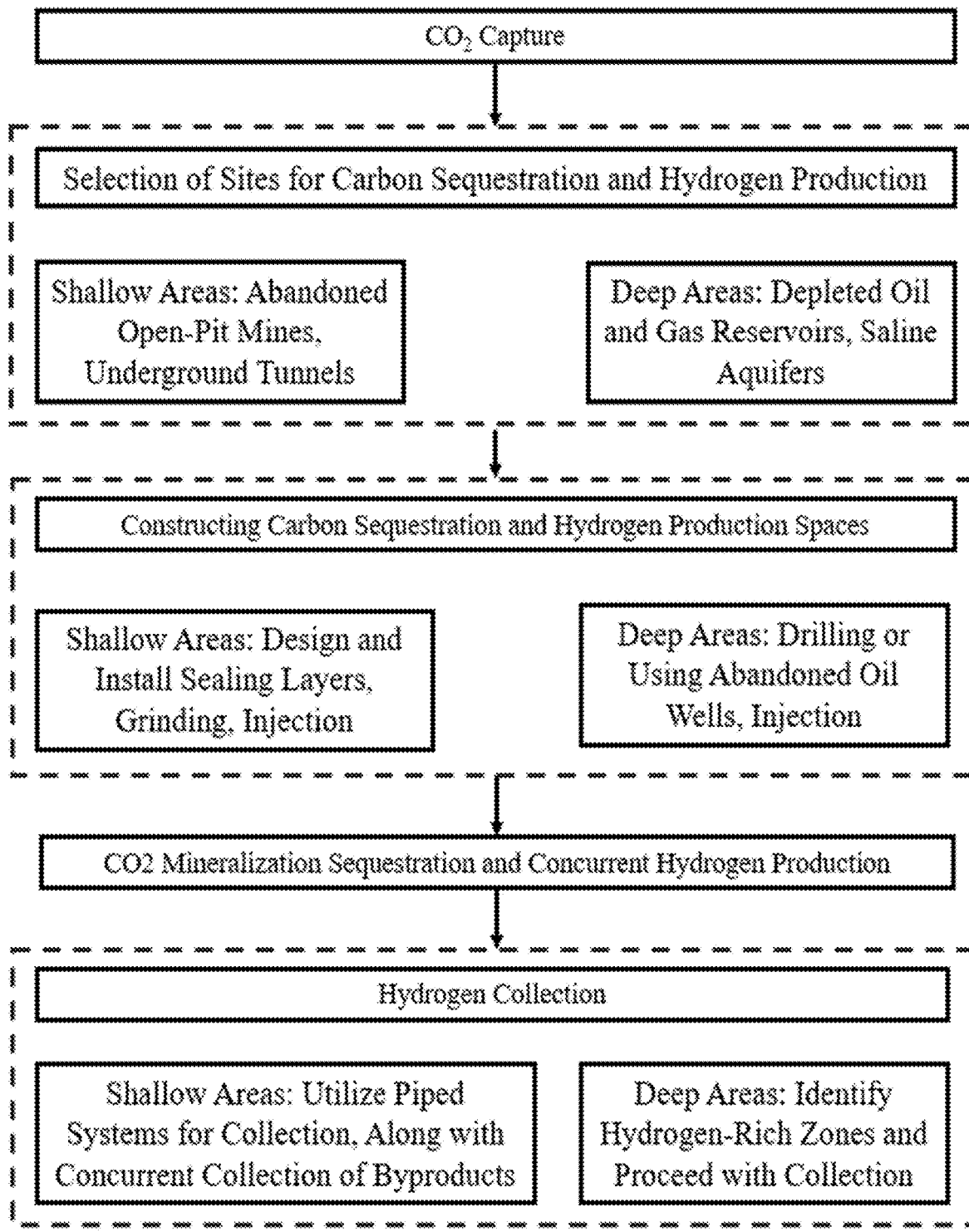
FIG. 4: Process flow diagram of carbon sequestration and hydrogen production.

This embodiment provides a method for geological carbon sequestration and hydrogen production, utilizing the geological structure of an abandoned open-pit mine as shown in FIG. 1. The method is based on the spontaneous reaction of water, $CO_2$, and reactive minerals, and the process is illustrated in FIG. 4. The steps are as follows:

(1) $CO_2$ Collection

Collecting $CO_2$ produced from industrial activities;

(2) Selection of Carbon Sequestration and Hydrogen Production Site

Using the abandoned open-pit mine as the artificial sealing layer 4;

(3) Construction of Carbon Sequestration and Hydrogen Production Space

The artificial sealing layer 4 is filled with ground basalt, pyrrhotite slag, and other reactive rocks, providing a site for the spontaneous reaction of water, $CO_2$, and reactive minerals for carbon sequestration and hydrogen production. The artificial sealing layer 4 is enclosed by an artificial confining layer 3, isolating it from the surrounding environment, sequestering $CO_2$, and preventing hydrogen leakage. The $CO_2$ injection channel 1 extends from the surface to the bottom of the reactive rocks in the artificial sealing layer 4, ensuring sufficient reaction between $CO_2$, water, and reactive rocks. The $H_2$ collection channels 2 are located on both sides of the $CO_2$ injection channel 1, connecting to the top of the artificial sealing layer 4 for easy hydrogen collection. Injecting $CO_2$ and water;

(4) $CO_2$ Mineralization and Simultaneous Hydrogen Production $CO_2$, water, and reactive minerals spontaneously react to achieve $CO_2$ mineralization and simultaneous hydrogen production;

(5) Hydrogen Collection

After $CO_2$ mineralization and hydrogen accumulation, hydrogen is stored in the rock pores and the upper space of the geological reaction layer. Hydrogen and other by-products are collected using pipelines as $H_2$ collection channels.

Example 2

Figure 2:
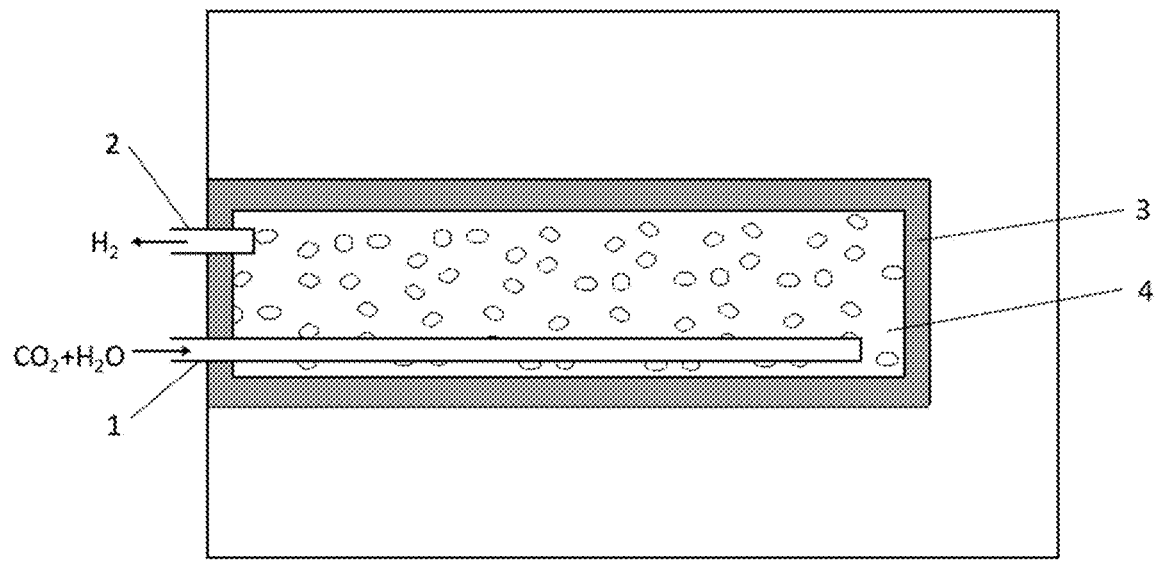
FIG. 2: Schematic diagram of carbon sequestration and hydrogen production in an underground tunnel.

This embodiment provides a method for geological carbon sequestration and hydrogen production, utilizing the geological structure of an underground tunnel as shown in FIG. 2. The method is based on the spontaneous reaction of water, $CO_2$, and reactive minerals. The steps are as follows:

(1) $CO_2$ Collection

Collecting $CO_2$ produced from industrial activities;

(2) Selection of Carbon Sequestration and Hydrogen Production Site

Using the underground tunnel as the artificial sealing layer 4;

(3) Construction of Carbon Sequestration and Hydrogen Production Space

The artificial sealing layer 4 is filled with ground basalt, pyrrhotite slag, and other reactive rocks, providing a site for the spontaneous reaction of water, $CO_2$, and reactive minerals for carbon sequestration and hydrogen production. The artificial sealing layer 4 is enclosed by an artificial confining layer 3, isolating it from the surrounding environment, sequestering $CO_2$, and preventing hydrogen leakage. The $CO_2$ injection channel 1 extends from the entrance of the underground tunnel to the bottom of the reactive rocks in the artificial sealing layer 4, ensuring sufficient reaction between $CO_2$, water, and reactive rocks. The $H_2$ collection channels 2 are located above the $CO_2$ injection channel 1, connecting to the top of the reactive rocks in the artificial sealing layer 4 for easy hydrogen collection. Inject $CO_2$ and water;

(4) $CO_2$ Mineralization and Simultaneous Hydrogen Production $CO_2$, water, and reactive minerals spontaneously react to achieve $CO_2$ mineralization and simultaneous hydrogen production;

(5) Hydrogen Collection

After the carbon dioxide mineralization and hydrogen accumulation processes are completed, hydrogen is stored within the rock pores and the upper space of the geological reaction layer. Hydrogen and other by-products are collected by laying pipelines as $H_2$ collection channels.

Example 3

Figure 3:
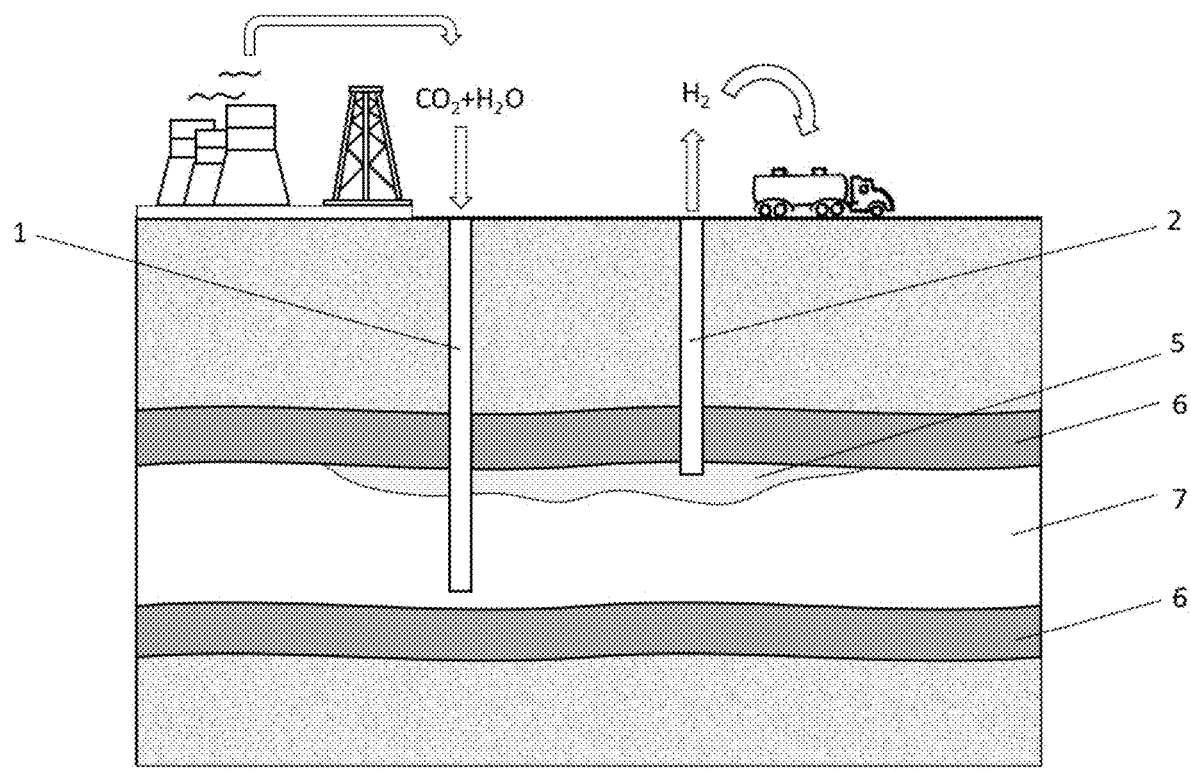
FIG. 3: Schematic diagram of the structure for carbon sequestration and hydrogen production in deep reservoirs.

This embodiment provides a method for geological carbon sequestration and hydrogen production, utilizing the deep reservoir geological structure for carbon sequestration and hydrogen production, as shown in FIG. 3. The method is based on the spontaneous reaction of water, $CO_2$, and reactive minerals. The steps are as follows:

(1) $CO_2$ Collection

Collecting $CO_2$ produced from industrial activities;

(2) Selection of Carbon Sequestration and Hydrogen Production Site

Using a natural saline aquifer, depleted oil and gas reservoir, or a basalt formation rich in natural fractures as the natural mineralization sequestration layer 7;

(3) Construction of Carbon Sequestration and Hydrogen Production Space

The natural mineralization sequestration layer 7 contains reactive minerals for sequestering $CO_2$ and serves as the site for the spontaneous reaction of water, $CO_2$, and reactive minerals for carbon sequestration and hydrogen production. The natural sealing cap layer 6 prevents $CO_2$ and hydrogen from leaking into other areas under pressure. The $CO_2$ injection channel 1, formed by drilling a well, reaches the bottom of the natural mineralization sequestration layer 7 to inject $CO_2$ and water into the carbon sequestration and hydrogen production area. The $H_2$ collection channel 2, also formed by drilling, is located at the top of the carbon sequestration and hydrogen production area for collecting hydrogen. Due to the lower density of hydrogen compared to most fluids, a hydrogen-rich area 5 will form above the natural mineralization sequestration layer 7. Connecting the $H_2$ collection channel 2 to this area facilitates hydrogen collection;

(4) $CO_2$ Mineralization and Simultaneous Hydrogen Production $CO_2$, water, and reactive minerals undergo a spontaneous reaction based on the $CO_2$-water-reactive mineral system, leading to $CO_2$ mineralization and simultaneous hydrogen production;

(5) Hydrogen Collection

After $CO_2$ mineralization and hydrogen accumulation, hydrogen is stored within the rock pores and the upper space of the geological reaction layer. The hydrogen-rich area is identified, and hydrogen is collected using the drilled well;

Example 4

This embodiment studies the effectiveness of the method for $CO_2$ mineralization and simultaneous hydrogen production under simulated conditions. The working principle of the present invention, which involves the spontaneous reaction of water, $CO_2$, and reactive minerals to produce hydrogen, can be represented by the following chemical equations:

$$CO_2 + MgO/CaO = MgCO_3/CaCO_3 \quad (1)$$

$$2FeO + H_2O = H_2 + Fe_2O_3 \quad (2)$$

Carbon dioxide reacts with calcium and magnesium ions in rocks, resulting in mineralization and carbon sequestration (Reaction 1). Additionally, iron-rich rocks undergo interactions with water and $CO_2$, producing significant amounts of hydrogen (Reaction 2). When carbon dioxide dissolves in water, it forms carbonic acid. The acidity of carbonic acid causes minerals containing ferrous ions, such as pyroxene, magnetite, and olivine, to dissolve and release ferrous ions. These released ferrous ions are adsorbed onto the surface of basalt, where they act as electron donors, reducing water and generating hydrogen.

Figure 5:
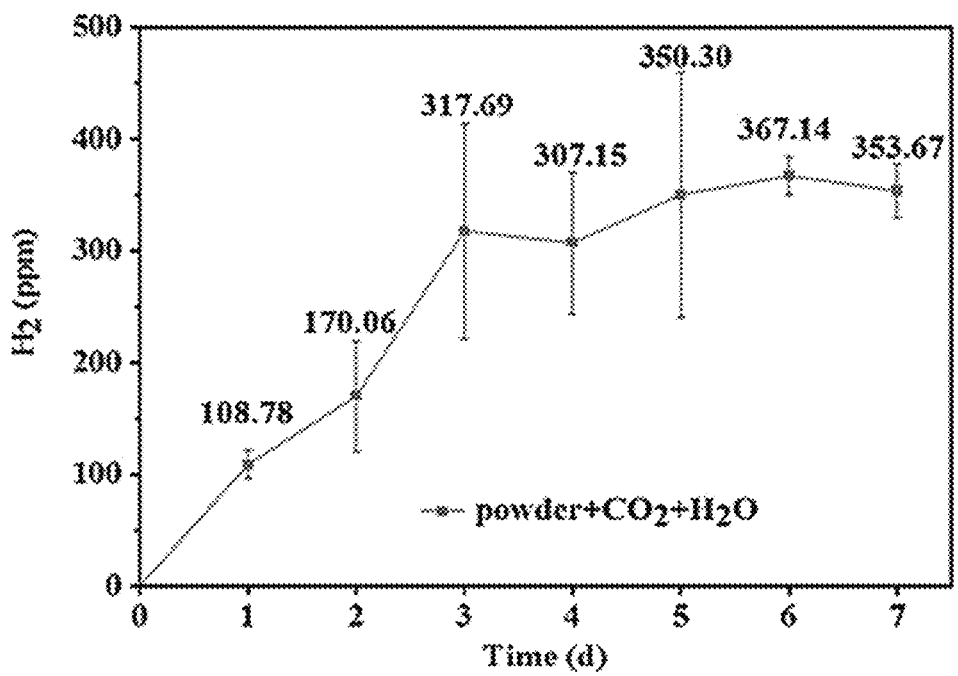
FIG. 5: Hydrogen production curve of basalt over time obtained from laboratory experiments.
Figure 6:
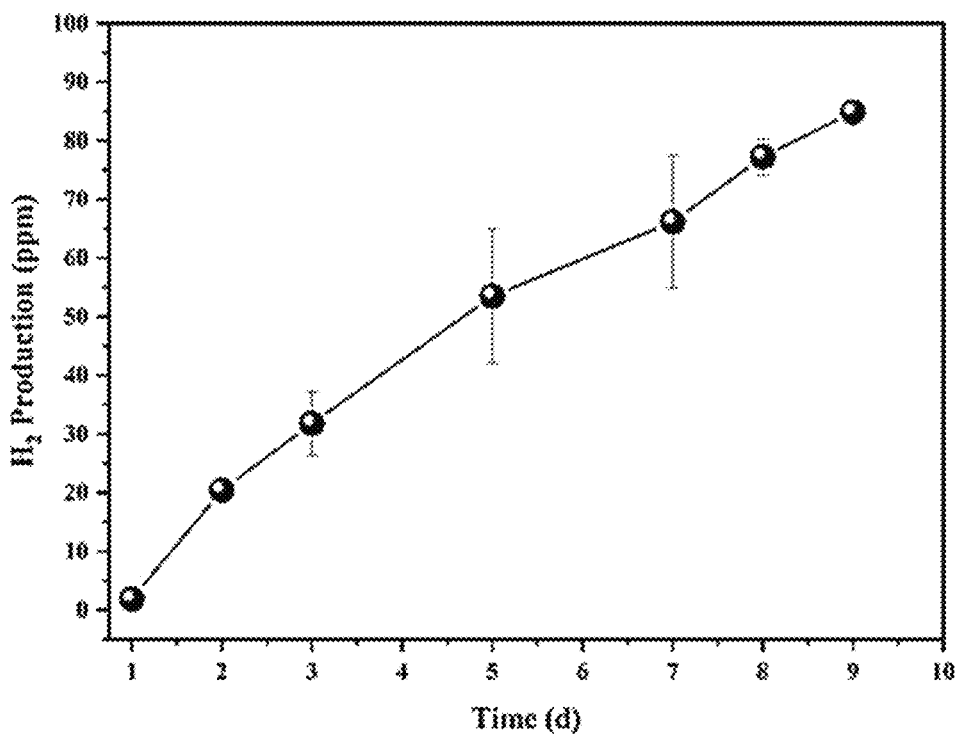
FIG. 6: Hydrogen production curve of chalcopyrite and pyrite over time obtained from laboratory experiments.

The effectiveness of spontaneous $CO_2$-water-basalt reactions for $CO_2$ mineralization and simultaneous hydrogen production was studied through laboratory experiments. In the experiment, 2 grams of rock samples were first crushed and then placed in a ball mill jar, which was evacuated and ball-milled under anoxic conditions for 20 hours. The rock powder was then extracted with 100 mL of water in an anoxic glovebox and transferred to small glass vials (5 mL each). Dry ice ($CO_2$) was added to the vials, which were then sealed and allowed to react for a set period. Hydrogen production was measured using gas chromatography. The experiment produced a time-dependent curve of hydrogen production from basalt, as shown in FIG. 5. Hydrogen production increased steadily for the first three days, stabilizing thereafter. The results also indicated that the water-$CO_2$-basalt reaction produces hydrogen, whereas the water-basalt reaction does not produce hydrogen in the absence of $CO_2$. This suggests that the coexistence of groundwater and basalt over millions of years has reached a stable state, and hydrogen production occurs only when additional $CO_2$ is introduced, as in the sequestration process.

The above describes the preferred specific embodiments of the present invention in detail. It should be understood that those skilled in the art can make numerous modifications and variations based on the concept of the invention without creative efforts. Therefore, any technical solutions derived from logical analysis, reasoning, or limited experiments based on the concept of the invention by those skilled in the art should fall within the protection scope defined by the claims.

What is claimed is:

1. A geological carbon sequestration and hydrogen production structure, characterized by including comprising
   a $CO_2$ injection channel, an $H_2$ collection channel, a geological reaction mineral layer, and a sealing structure;
   wherein the geological reaction mineral layer comprises active minerals that serve as both filling material and reaction substrate, an outer layer of the geological reaction mineral layer is enclosed by the sealing structure,
   wherein the sealing structure prevents the diffusion of $CO_2$ and hydrogen from inside of the geological reaction mineral layer to outside of the geological reaction mineral layer,
   wherein the $CO_2$ injection channel penetrates the sealing structure and extends into the geological reaction mineral layer for injecting $CO_2$ and water for a reaction, hydrogen produced by the reaction escapes from the geological reaction mineral layer due to a density difference with the active minerals and is collected through the $H_2$ collection channel that penetrates the sealing structure, wherein the active minerals have a capability of carbon sequestration and hydrogen production, and comprises metal oxides that react with $CO_2$ to form carbonates and ferrous ions that react with water to produce hydrogen, wherein based on a depth of a carbon sequestration and hydrogen production strata, the geological carbon sequestration and hydrogen production structure is divided into shallow geological carbon sequestration and hydrogen production structures, and deep geological carbon sequestration and hydrogen production structures, and wherein in the shallow geological carbon sequestration and hydrogen production structure, the sealing structure is an artificial confining layer, and the geological reaction mineral layer is an artificial sealing layer, which includes one of an abandoned open-pit mine or an abandoned underground mining tunnel.

2. The geological carbon sequestration and hydrogen production structure according to claim 1, wherein the active minerals include at least one of siderite, nickeliferous siderite, pyroxene, olivine, magnetite, pyrrhotite, and basalt.

3. The geological carbon sequestration and hydrogen production structure according to claim 1, wherein in the deep geological carbon sequestration and hydrogen production structure, $H_2$ accumulates to form a hydrogen-rich area under a barrier of the sealing structure after escaping from the geological reaction mineral layer, and is recovered through the $H_2$ collection channel; the sealing structure is a natural sealing cap layer; the geological reaction mineral layer is a natural mineralization sequestration layer, which includes one of a natural saline aquifer, a depleted oil and gas reservoir, or a basalt formation rich in natural fractures.

4. A geological carbon sequestration and hydrogen production method employing the geological carbon sequestration and hydrogen production structure of claim 1 for geological carbon sequestration and hydrogen production, comprising the following steps:

(1) $CO_2$ collection:
collecting $CO_2$ generated from industrial activities;

(2) selection of carbon sequestration and hydrogen production site:
selecting suitable areas for geological carbon sequestration and hydrogen production through geological surveys and other means, designating the suitable areas as geological reaction mineral layers, dividing the geological reaction mineral layers into shallow geological carbon sequestration and hydrogen production site and deep geological carbon sequestration and hydrogen production site based on the depth of the carbon sequestration and hydrogen production strata;

(3) construction of carbon sequestration and hydrogen production space:
using sealing structures to enclose the geological reaction mineral layer for sequestering $CO_2$ and preventing hydrogen leakage, connecting the $CO_2$ injection channel and the $H_2$ collection channel through the sealing structure into the geological reaction mineral layer, creating a space that facilitates carbon sequestration and hydrogen production as well as a subsequent collection of products, injecting $CO_2$ and water into the geological reaction mineral layer through the $CO_2$ injection channel;

(4) $CO_2$ mineralization sequestration and simultaneous hydrogen production:
conducting $CO_2$ mineralization sequestration and simultaneous hydrogen production through a spontaneous reaction of $CO_2$, water, and active minerals based on a $CO_2$-water-active mineral reaction;

(5) hydrogen collection:
after completion of $CO_2$ mineralization and hydrogen accumulation, storing hydrogen in rock pores and an upper space of a reservoir within the geological reaction mineral layer, and collecting hydrogen and other byproducts through the $H_2$ collection channel.

5. The method according to claim 4, wherein in the step (2), the shallow geological carbon sequestration and hydrogen production site are artificial sequestration layers, comprising abandoned open-pit mines and abandoned underground mining tunnels; the deep geological carbon sequestration and hydrogen production site are natural mineralization sequestration layers, comprising natural saline aquifers, depleted oil and gas reservoirs, and basalt formations rich in natural fractures.

6. The method according to claim 5, wherein when the shallow geological carbon sequestration and hydrogen production site is used in the step (2), a construction process of the carbon sequestration and hydrogen production space in the step (3) comprises designing and laying artificial sealing layers, grinding the active minerals and filling the active materials into the artificial sequestration layers, and injecting $CO_2$ and water, and wherein when the deep geological carbon sequestration and hydrogen production site is used in the step (2), a deep reservoir in the step (3) comprises a natural mineralization sequestration layer and a natural sealing cap layer, with $CO_2$ and water injected using drilling or abandoned oil and gas wells.

7. The method according to claim 5, wherein when the shallow geological carbon sequestration and hydrogen production site is used in the step (2), in the step (5), hydrogen and byproducts are collected using pipelines as the $H_2$ collection channel; and when the deep geological carbon sequestration and hydrogen production site is used in the step (2), in the step (5), hydrogen is collected by identifying hydrogen-rich areas and using wellbores as the $H_2$ collection channel.

* * * * *